US012355845B2

(12) United States Patent
Pillers et al.

(10) Patent No.: US 12,355,845 B2
(45) Date of Patent: *Jul. 8, 2025

(54) METHODS AND APPARATUS FOR CENSUS AND PANEL MATCHING USING HTTP HEADERS

(71) Applicant: The Nielsen Company (US), LLC, New York, NY (US)

(72) Inventors: Cary Pillers, Dallas, TX (US); Suraj Jagga, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 548 days.

This patent is subject to a terminal disclaimer.

(21) Appl. No.: 17/466,891

(22) Filed: Sep. 3, 2021

(65) Prior Publication Data

US 2021/0400114 A1    Dec. 23, 2021

Related U.S. Application Data

(63) Continuation of application No. 16/368,266, filed on Mar. 28, 2019, now Pat. No. 11,115,483.

(51) Int. Cl.
*H04L 67/146* (2022.01)
*G06Q 30/0201* (2023.01)
(Continued)

(52) U.S. Cl.
CPC ....... *H04L 67/146* (2013.01); *G06Q 30/0201* (2013.01); *G06Q 30/0242* (2013.01); *H04L 12/4633* (2013.01); *H04L 67/025* (2013.01)

(58) Field of Classification Search
None
See application file for complete search history.

(56) References Cited

U.S. PATENT DOCUMENTS 8,601,591 B2    12/2013    Krishnamurthy et al.
9,721,108 B2     8/2017    Krishnamurthy et al.
(Continued)

FOREIGN PATENT DOCUMENTS

KR    20140004185    1/2014
KR    20180042837    4/2018

OTHER PUBLICATIONS

United States Patent and Trademark Office, "Non-Final Office Action", issued in connection with U.S. Appl. No. 16/368,266, filed May 29, 2020, 14 pages.
(Continued)

*Primary Examiner* — Schquita D Goodwin
*Assistant Examiner* — Ishrat Rashid

(57) ABSTRACT

Methods, apparatus, and systems are disclosed for census and panel matching using Hypertext Transfer Protocol (HTTP) headers. An example apparatus includes memory, instructions in the apparatus, and processor circuitry to execute the instructions transmit a first session identifier in an HTTPS header property of a network message to a proxy server, the proxy server to parse the first session identifier from the HTTPS header property, and transmit a second session identifier in the HTTPS header property when the second session identifier is different from the first session identifier, wherein the first session identifier or the second session identifier is transmitted to a monitoring entity, the monitoring entity associating the first session identifier or the second session identifier with at least a panel identifier.

19 Claims, 11 Drawing Sheets

(51) Int. Cl.
*G06Q 30/0242* (2023.01)
*H04L 12/46* (2006.01)
*H04L 67/025* (2022.01)

(56) References Cited

U.S. PATENT DOCUMENTS

| | | | |
|---|---|---|---|
| 11,115,483 B2 | 9/2021 | Pillers et al. | |
| 2002/0169847 A1* | 11/2002 | Luna | H04L 67/563 709/216 |
| 2006/0277596 A1* | 12/2006 | Calvert | H04L 63/0218 726/3 |
| 2010/0064134 A1 | 3/2010 | Gross et al. | |
| 2010/0161795 A1* | 6/2010 | Deridder | H04L 67/146 709/224 |
| 2010/0211780 A1* | 8/2010 | Mukkara | H04L 63/1466 713/168 |
| 2012/0072557 A1* | 3/2012 | Fujisawa | H04L 63/0428 709/220 |
| 2012/0173701 A1* | 7/2012 | Tenbrock | G06Q 30/0242 709/224 |
| 2013/0198125 A1* | 8/2013 | Oliver | G06Q 30/0204 706/46 |
| 2014/0278934 A1 | 9/2014 | Gutierrez | |
| 2014/0317738 A1 | 10/2014 | Be'ery et al. | |
| 2014/0325551 A1* | 10/2014 | McMillan | H04N 21/6175 725/20 |
| 2015/0178769 A1* | 6/2015 | Mirisola | G06Q 30/0246 705/14.45 |
| 2018/0234518 A1 | 8/2018 | Zhu et al. | |
| 2018/0359605 A1 | 12/2018 | Splaine et al. | |
| 2019/0037047 A1 | 1/2019 | Shribman et al. | |

OTHER PUBLICATIONS

United States Patent and Trademark Office, "Non-Final Office Action", issued in connection with U.S. Appl. No. 16/368,266, filed Dec. 16, 2020, 5 pages.

United States Patent and Trademark Office, "Notice of Allowance and Fee(s) Due", issued in connection with U.S. Appl. No. 16/368,266, filed May 5, 2021, 5 pages.

International Searching Authority, "International Search Report and Written Opinion", issued in connection with International Application No. PCT/US2020/024754, dated Jul. 13, 2020, 10 pages.

Shbair et al., "A Multi-Level Framework to Identify HTTPS Services", In: NOMS 2016-2016 IEEE/IFIP Network Operations and Management Symposium, Istanbul, Jul. 4, 2016, 9 pages.

* cited by examiner

METHODS AND APPARATUS FOR CENSUS AND PANEL MATCHING USING HTTP HEADERS

RELATED APPLICATIONS

This patent arises from a continuation of U.S. patent application Ser. No. 16/368,266, now U.S. Pat. No. 11,115,483, filed on Mar. 28, 2019. U.S. patent application Ser. No. 16/368,266 is hereby incorporated herein by reference in its entirety.

FIELD OF THE DISCLOSURE

This disclosure relates generally to audience measurement, and, more particularly, to methods and apparatus for census and panel matching using Hypertext Transfer Protocol (HTTP) headers.

BACKGROUND

Audience measurement of media permits media content providers to obtain measurement data that provides comprehensive information of how users connect and interact with media content (i.e., the location, time, and method of accessing particular media content or advertising). Such measurements can include radio listenership, newspaper and magazine readership, television viewing, website traffic, as well as other data specific to audience demographics and total viewing time of a particular medium. To enable direct measurement, publishers of website content incorporate beacons (i.e., Hypertext Transfer Protocol requests) into their content to enable beacon activation during content consumption. The beacon in turn provides data about directly measurable user attributes such as the platform used and geography. When the content accessed by a user has been tagged, a website browser sends a beacon to a data collection facility associated with an audience measurement entity. The beacon can include identifier information for both panelists (e.g., users enrolled in a panel who have consent to being monitored) and non-panelists, thereby generating census-like measurement data.

DETAILED DESCRIPTION

Figure 1:
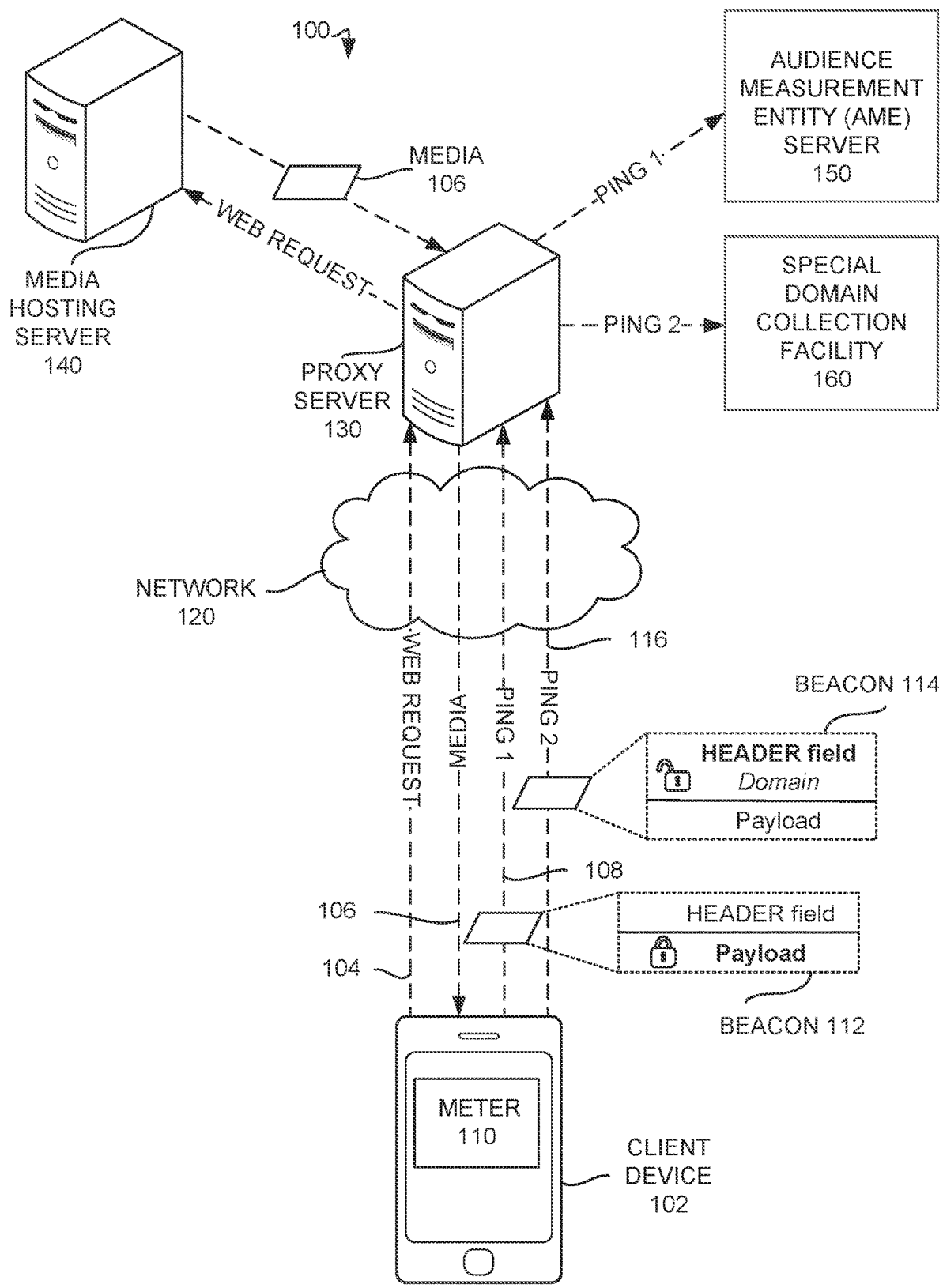
FIG. 1 is a block diagram illustrating an example environment in which a proxy server operates to match session identifiers in a beacon to identifiers in an external panel based system.

Example methods, systems and apparatus disclosed herein match census and panel identifiers using Hypertext Transfer Protocol (HTTP) headers. For example, techniques disclosed herein enable the injection of session identifiers into, and the retrieval of session identifiers from, information included in a non-encrypted header property of network messages (e.g., a generic non-encrypted HTTP Secure (HTTPS) header property).

Monitoring user access to Internet resources such as webpages and advertisements is done using audience measurement entities (AMEs) which record media access when a tag embedded by media providers within the media source (e.g., a Hypertext Markup Language (HTML) code) executes on a user device. For example, the user device (e.g., mobile device) can request online media via a browser that renders media or a non-browser based application that presents media. This initiates a hypertext transfer protocol (HTTP) request (also known as a beacon) to an Internet address defined by a uniform resource locator (URL) specified by the media provider (e.g., a content provider and/or advertising entity). The AME records media access when an embedded tag associated with the requested online media executes on the user device using Java, JavaScript and/or other executable instructions. Methods, apparatus and systems for tagging media in this manner are disclosed in U.S. Pat. No. 6,108,637, by Blumenau, entitled "Content Display Monitor," which is hereby incorporated by reference in its entirety.

Execution of the tag results in the browser sending a beacon to a data collection facility associated with the audience measurement entity (e.g., audience measurement entity server). In some examples, the beacon request is an HTTP request (e.g., an HTTP GET request, an HTTP POST request, an HTTP CONNECT request, etc.). The request method used defines the desired action to be performed: An HTTP GET method retrieves information from a specified resource (e.g., a server), an HTTP POST request is used to submit an entity to the resource (e.g., submitting data enclosed in the body of a request message for storage in a web server, such as uploading a file), and an HTTP CONNECT request establishes a tunnel to the server identified by the target resource (e.g., to access websites with security features such as HTTPS, a proxy server can be asked to tunnel the connection to the desired HTTPS site, with the proxy server establishing the connection and continuing to proxy the data stream to and from the user device).

The beacon carries identification information that is collected, compiled and/or analyzed by the AME, thereby enabling monitoring data that reflects information about media that is accessed by the user device to be tracked by the AME. The identification information in the beacon can include: a user agent string (e.g., identify user device making the media content request), a media identifier (e.g., identify media, such as a website address, with which a tag is associated), a host identifier (e.g., identify the host, such as a web server, with which the requested media is associated), a timestamp (e.g., identify dates and times when media content is accessed, requested, and/or received), and one or more command identifiers (e.g., identify control commands, such as pause/play/stop, acted upon the media).

While AMEs can collect data specific to panelists (e.g., users who have consented to be part of a panel and have provided demographic information when registering with the panel), the AMEs are also able to collect data on non-panelist media content requests, given that nearly every browser that accesses tagged media responds to the tag by sending a beacon to the AME. This is facilitated by the fact that commercially available browsers (e.g., Mozilla® Firefox®, Microsoft® Internet Explorer®, Google Chrome™ browser, etc.) interpret a beacon as any other request to retrieve Internet media or transmit data, such that these browsers do not require any modification to participate in the audience measurement data collection process. Therefore, tagging allows the collection of census-like data that includes panelist and non-panelist information. Data collected using a tagging approach such as the one described above is herein identified as census data or census measurement data. As a result, a beacon can also transmit a session identifier, which serves as an identifier for a session generated as a result of a request for media sent by a user device. To determine whether the session identifier belongs to a specific panelist, it can be matched with a panelist identifier.

Given that companies and/or individuals producing content and/or advertisements want to understand the reach and effectiveness of this media, it is useful to identify and retrieve panel and census identifier information from beacons generated by the user device. This information is more specific to the user than the information generated at the server level. For example, collection of information at the server level does not allow for the differentiation of a media impression (e.g., viewing of an advertisement) generated by a panelist versus a non-panelist. More specific information relating to the unique identification of the requesting device and/or the user making the request is not captured by a server, given that it may log an Internet Protocol (IP) address of a device that requested the information, but the IP addresses can change and/or requests can come through proxy servers that mask the identity of the user device making the request.

Companies such as The Nielsen Company (US), LLC utilize on-device meters to monitor usage of cellphones, tablets (e.g., iPads™) and/or other computing devices (e.g., PDAs, laptop computers, etc.). An on-device meter (ODM) can be implemented by software that collects data of interest concerning usage of the monitored device. For example, the ODM can collect data indicating media access activities (e.g., website names, dates/times of access, clickstream data and/or other media identifying information (e.g., webpage content, advertisements, etc.)) to which a panelist is exposed. This data is uploaded, periodically or aperiodically, to a data collection facility (e.g., the audience measurement entity server). The data collected by a meter is referred to herein as ODM data or panelist data. Given that a panelist submits their demographic data when registering with an AME, ODM data is advantageous in that it links this demographic information and the activity data collected by the ODM, providing this combined information via, for example, a panelist identifier included in the ODM data that is transmitted using a beacon to the AME. This data, including the session identifiers, is transmitted on the network using a network packet. The packets are split into three parts: a header, a payload, and a trailer. The header includes instructions about the data being transmitted, the payload is the actual data being delivered, and the trailer can include information indicating that the receiving device has reached the end of the packet. For example, the information that can be retrieved from a beacon (e.g., user agent string, timestamp, host identifier) can be contained in the header field of the network packet. If a beacon is sent as a HTTP request, the header is not encrypted while the package is encrypted. A beacon sent using an HTTPS request causes both the header and package to be encrypted.

The move to secure network messages (also known as pings) makes it difficult to detect session identifiers in the payload. Any existing identifiers that are used to match up with an external panel based system (e.g., audience measurement entity) are immediately broken since existing systems require the ability to extract these identifiers from a parameter in the payload, but when the use of secure network messages cause the payload to be encrypted, retrieval of panel identifiers becomes restricted. Some solutions include the use of an extra ping that contains information sent in the domain, which is located in the header field and therefore not encrypted when sent using an HTTP request. Other methods of retrieving the panel identifiers from the payload rely on the use of non-secure methods to send the data, leaving the payload field unencrypted. However, lack of encryption of the payload field leaves the data contained within vulnerable to exploitation, while the use of extra pings to send the panel identifier data in the header field incurs additional costs to the user as well as costs associated with sequencing of the extra data and additional capacity planning for the data collection facility retrieving and storing the data.

Example methods, systems and apparatus disclosed herein can be used to send session identifiers using only one network message/ping, instead of multiple pings, utilizing secure network message headers. Examples disclosed herein facilitate the matching of panel and census identifiers by the audience measurement entity (AME) by permitting the extraction of session identifiers that are needed to associate the user's panelist information with the media request content information. At the AME, the panelist identifier may then be used to associate demographic information to monitoring information. For example, the age of a panelist may be used to determine an age range of viewers likely to watch a television show.

Example methods, systems and apparatus disclosed herein cause an identifier (e.g., session identifier) to be included in a non-encrypted header property (e.g., a generic non-encrypted HTTPS header property) of the network message. The generic non-encrypted HTTPS header property may include, for example, a user agent, a referrer field, etc. In the examples disclosed herein, the HTTPS header is used to retrieve a session identifier. The examples disclosed herein do not relate to the retrieval of a user identifier.

While examples disclosed herein make reference to using the HTTPS header property, the disclosure is not limited to the use of the user agent, and can be any non-encrypted field in the header. The disclosed examples therefore may utilize one or more generic non-encrypted HTTPS header properties including, but not limited to, the user agent, or any other non-encrypted field.

Examples disclosed herein facilitate the retrieval of session identifiers from a beacon using a proxy server such that when the proxy server sees the traffic, it can capture the session identifier without the need to decrypt the payload. This can be accomplished by, for example, sending beacons using the HTTP CONNECT method which is used for tunneling through a proxy server when sending a media content request. In the examples disclosed herein, a session identifier is set by a software development kit (SDK) and the identifier is inserted into the network message header field. In the examples disclosed herein, the reloading of the SDK (e.g., accessing a new web page would begin a new session) causes the regeneration of the identifier (e.g., insertion into the header field). In some examples, the identifier can be inserted into the header field every time the session reloads. In some examples, the session identifier can be inserted into another field of the header or payload depending on, for example, the type of HTTP request generated. In some examples, once the session identifiers have been retrieved, not every ping needs to include the session identifiers in the HTTPS header. In some examples, once the proxy server has been changed, this can trigger the reinsertion of the panel identifiers into the HTTPS header in order for the new proxy server to retrieve the session identifiers and establish an association with the user device. In some examples, the session identifier information may not be replaced every time to increase user privacy and decrease the number of pings generated that include session identifiers in the HTTPS header of the network messages. The examples disclosed herein allow the reduction of additional data processing otherwise needed with the use of extra pings to send the session identifier in the header of the network message, furthermore eliminating the need for additional data collection facilities to handle data processing and storage.

While examples disclosed herein are described in connection with browser-based interfaces used to present online media, disclosed techniques may also be used in connection with non-browser based applications that render media such as service-specific applications (e.g., client applications to stream media).

FIG. 1 is a block diagram illustrating an example environment 100 in which a proxy server operates to match identifiers in a beacon to identifiers in an external panel based system. The example environment 100 of FIG. 1 includes a client device 102, a proxy server 130, a media hosting server 140, an audience measurement entity (AME) server 150, and a special domain collection facility 160. In some examples, the AME server 150 is implemented using multiple devices and/or the media hosting server 140 is implemented using multiple devices and/or the proxy server 130 is implemented using multiple devices. For example, the AME server 150 and/or the media hosting server 140 and/or the proxy server 130 may include disk arrays or multiple workstations (e.g., desktop computers, workstation servers, laptops, etc.) in communication with one another. In the illustrated example, the AME server 150 is in selective communication with the media hosting server 140 and/or the client device 102 and/or the proxy server 130 and/or the collection facility 160 via one or more wired and/or wireless networks represented by network 120. Example network 120 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, an audience measurement entity operates and/or hosts the example AME server 150. The AME of the illustrated example is an entity that monitors and/or reports access to tagged media. The AME server 150 of the illustrated example is a server and/or database that collects and/or receives monitoring information related to tagged media (e.g., media having inserted or embedded executable instructions that causes the media view (e.g., impression) to be recorded by, for example, the AME server 150). The AME of the illustrated example is a neutral entity that is not involved with the distributing of media.

In the illustrated example of FIG. 1, a media provider operates and/or hosts the media hosting server 140 that responds to requests for media that may include tags. For example, the media provider may engage the AME to collect and/or monitor information related to media associated with the media provider. Such a media provider may wish to use tagged media in a media campaign to determine the effectiveness of the media campaign. In some examples, the information returned in response to the request for media includes an instruction (e.g., tag) to inform the AME server 150 of the accessing of tagged media. In some examples, the information returned in response to the request for media includes a reference to a tag and/or executable monitoring instructions. For example, the tag and/or executable monitoring instructions may be hosted at the AME server 150, which permits the AME to directly control the content of the tag and/or executable monitoring instructions. In some examples, the tag and/or executable monitoring instructions are hosted at the media hosting server 140. By including a reference to a tag and/or executable monitoring instructions in the media, the content of the tag (e.g., executable monitoring instructions) may be changed at any time without modifying the media. For example, the tag and/or executable monitoring instructions may be updated to improve efficiency of collecting information for tagged media by updating the executable instructions hosted at the AME server 150 and/or the media hosting server 140. Tagged media can include an executable monitoring instruction that serves as a tag or a reference to monitoring instructions stored at an external location such as a server. In some examples, the media hosting server 140 is operated and/or hosted by a third party. In addition, for simplicity, only one media hosting server 140 is shown in FIG. 1, although multiple media hosting servers are likely to be present.

In the illustrated example of FIG. 1, the client device 102 is a smartphone (e.g., an Apple® iPhone®, a Motorola™ Moto X™, a Nexus 5, an Android™ platform device, etc.). However, any other type of device may additionally or alternatively be used such as, for example, a tablet (e.g., an Apple® iPad™, a Motorola™ Xoom™, etc.), a laptop computer, a desktop computer, a camera, an Internet compatible television, a smart TV, etc. The client device 102 of FIG. 1 (sometimes referred to herein as a "user device" or "mobile device") is used to access (e.g., request, receive, render and/or present) online media that is tagged and returned by the media hosting server 140. For example, the user may execute a web browser on the client device 102 to request streaming media (e.g., via an HTTP request) from the media hosting server 140. In response to accessing the tagged media, media impression information, including device location information, is sent to the AME server 150.

The on-device meter 110 of the illustrated example of FIG. 1 is software provided to the client device by, for example, the AME server 150 when or after, for example, a panelist associated with the client device 102 agrees to be monitored. In the example of FIG. 1, the meter 110 collects monitoring information such as user-browser interaction, user-application interaction, browser identifying information, device status, user selection, user input, URL information, location information, image information, etc. Periodically and/or aperiodically, the meter 110 transmits the monitoring information to the AME server 150. In the illustrated example, the meter 110 may modify configuration settings of the device 102. For example, the meter 110 may modify a user agent setting for a browser. As a result, in some examples, HTTP requests generated by the device 102 can include a modified user agent as set by the meter 110.

In the illustrated example of FIG. 1, the client device 102 generates a web request 104 which is transferred to the media hosting server 140 via the proxy server 130, which causes the media hosting server 140 to respond with media 106 which can include a tag. The tagged media 106 includes executable instructions that, when executed by the browser of the device 102, causes the browser to send a communication (e.g., beacon) including monitoring information (e.g., census measurement data) to the AME server 150 via the proxy server 130. A beacon used for data transmission includes a header field and a payload field. The identifier can be positioned in the header or payload field of the network message. The illustrated example of FIG. 1 specifically shows the use of multiple network messages, or pings, to extract an identifier (e.g., session identifier). For example, the first ping 108 which transfers the beacon 112 to the proxy server 130 via network 120 includes the identifier(s) in the payload field of beacon 112. The payload is an encrypted field when the message is sent using HTTPS, thereby the identifiers are also encrypted. Due to the encryption, the proxy 130 cannot extract the identifier (e.g., session identifier) to use in matching with panel identifiers known by the AME server 150. As a result, a second ping 116 is generated that transmits a beacon 114 that contains the session identifier in the header field of the network message. For example, the identifier may be in the domain of the beacon 114, which is an unencrypted field that can be used by the proxy 130 to retrieve the identifier for storage in the special domain collection facility 160. This process permits the proxy 130 to match the census identifier retrieved from the header of the second ping 116 with the panel identifiers known to the AME server 150.

In some examples, the beacon 112 or 114 is implemented as an HTTP POST message, an HTTP GET message, an HTTP CONNECT message, or a similar message used in present and/or future HTTP protocols. For example, the beacon 112 or 114 can also include a location identifier (e.g., data specifying a device location corresponding to the geographic location at which the media was accessed), a media identifier (e.g., data specifying the media 106) and a timestamp corresponding to the date and/or time for when the media was accessed (e.g., data specifying when the media 106 was received).

The AME server 150 and special domain collection facility 160 of the illustrated example in FIG. 1 record that a request (e.g., the beacon 112 or 114) was received and record any data contained in the beacon 112 or 114 (e.g., the location identifier, the media identifier, the timestamp, a cookie, etc.). The special domain collection facility, for example, records the domain information retrieved by the proxy 130 from the domain field of the beacon 114. The AME server 150, in some examples, can respond to the request with an acknowledgement message. In some examples, the acknowledgement message requests and/or sets a cookie in the client device 102 to, for example, enable identification of subsequent beacons from the same client device.

Figure 2:
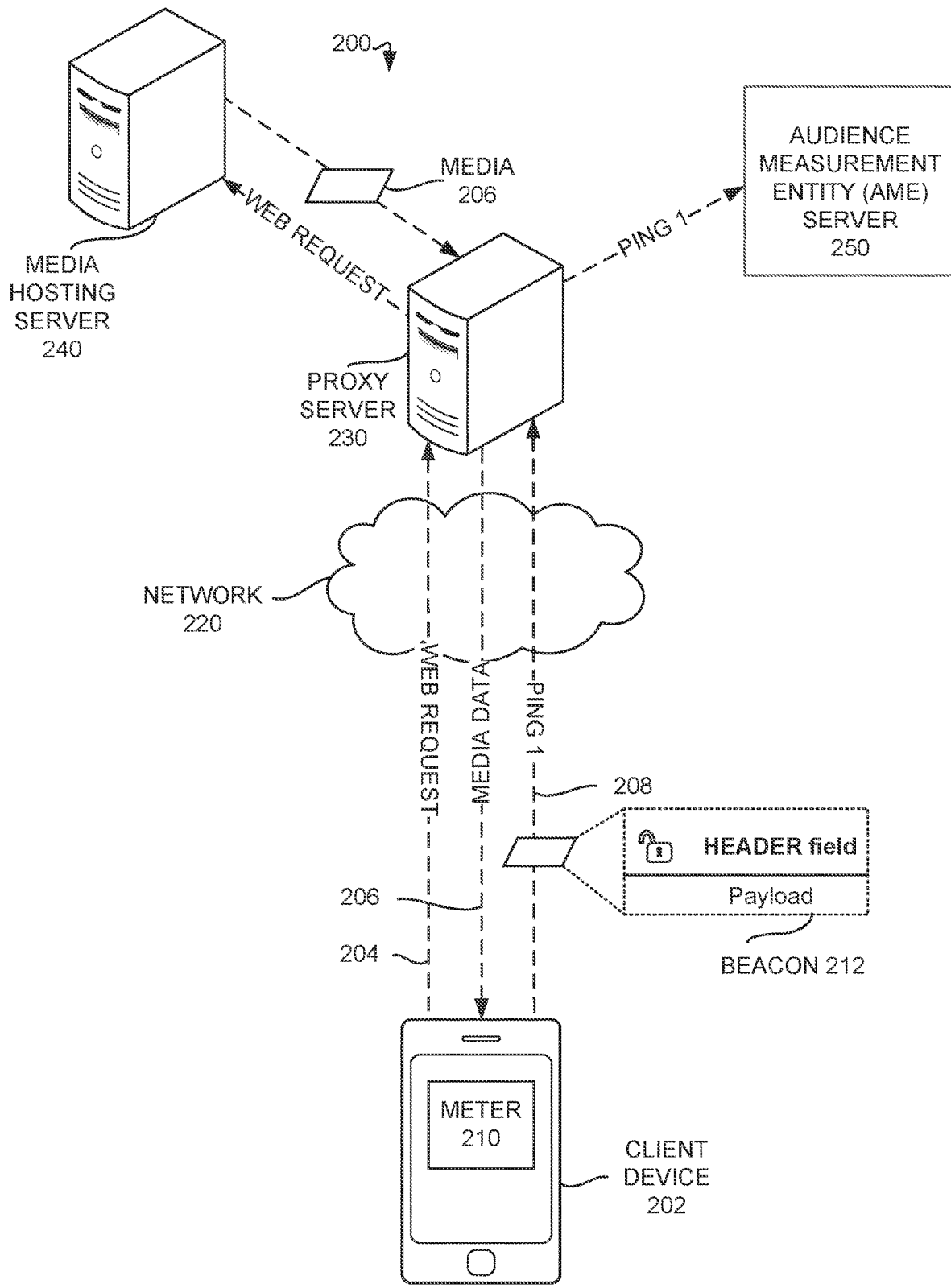
FIG. 2 is a block diagram illustrating an example environment constructed in accordance with the teachings of this disclosure in which a proxy server operates to match session identifiers in a beacon to identifiers in an external panel based system.

FIG. 2 is a block diagram illustrating an example environment 200 constructed in accordance with the teachings of this disclosure in which a proxy server operates to match session identifiers in a beacon to panel identifiers in an external panel-based system. The example environment 200 of FIG. 2 includes a client device 202, a proxy server 230, a media hosting server 240, and an audience measurement entity (AME) server 250. In some examples, the AME server 250 is implemented using multiple devices and/or the media hosting server 240 is implemented using multiple devices and/or the proxy server 230 is implemented using multiple devices. For example, the AME server 250 and/or the media hosting server 240 and/or the proxy server 230 may include disk arrays or multiple workstations (e.g., desktop computers, workstation servers, laptops, etc.) in communication with one another. In the illustrated example, the AME server 250 is in selective communication with the media hosting server 230 and/or the device 202 and/or the proxy server 230 via one or more wired and/or wireless networks represented by network 220. Example network may be implemented using any suitable wired and/or wireless network(s) including, for example, one or more data buses, one or more Local Area Networks (LANs), one or more wireless LANs, one or more cellular networks, the Internet, etc.

As previously shown in FIG. 1, in the illustrated example of FIG. 2 an audience measurement entity operates and/or hosts the example AME server 250. The AME of the illustrated example is an entity that monitors and/or reports access to tagged media and has all the same attributes of the AME server 150 of FIG. 1. In the illustrated example of FIG. 2, a media provider operates and/or hosts the media hosting server 240 that responds to requests for media that may include tags. In some examples, the information returned in response to the request for media includes an instruction (e.g., tag) to inform the AME server 250 of the accessing of tagged media. In some examples, the information returned in response to the request for media includes a reference to a tag and/or executable monitoring instructions. For example, the tag and/or executable monitoring instructions may be hosted at the AME server 250, which permits the AME to directly control the content of the tag and/or executable monitoring instructions. In some examples, the tag and/or executable monitoring instructions are hosted at the media hosting server 240. In some examples, the media hosting server 240 is operated and/or hosted by a third party. In addition, for simplicity, only one media hosting server 240 is shown in FIG. 1, although multiple media hosting servers are likely to be present.

In the illustrated example of FIG. 2, the client device 202 is a smartphone (e.g., an Apple® iPhone®, a Motorola™ Moto X™, a Nexus 5, an Android™ platform device, etc.). However, any other type of device may additionally or alternatively be used such as, for example, a tablet (e.g., an Apple® iPad™, a Motorola™ Xoom™, etc.), a laptop computer, a desktop computer, a camera, an Internet compatible television, a smart TV, etc. The client device 202 of FIG. 2 is used to access (e.g., request, receive, render and/or present) online media that is tagged and returned by the media hosting server 240. For example, the user may execute a web browser on the client device 202 to request streaming media (e.g., via an HTTP request) from the media hosting server 240. In response to accessing the tagged media, media impression information, including device location information, is sent to the AME server 250.

The on-device meter 210 of the illustrated example of FIG. 2 is software provided to the client device by, for example, the AME server 250 when or after, for example, a panelist associated with the device 202 agrees to be monitored. In the example of FIG. 2, the meter 210 collects monitoring information such as user-browser interaction, user-application interaction, browser identifying information, device status, user selection, user input, URL information, location information, image information, etc. Periodically and/or aperiodically, the meter 210 transmits the monitoring information to the AME server 250. In the illustrated example, the meter 210 may modify configuration settings of the client device 202.

In the illustrated example of FIG. 2, the client device 202 generates a web request 204 which is transferred to the media hosting server 240 via the proxy server 230, which causes the media hosting server 240 to respond with media 206 which can include a tag. The device 202 generates a beacon 212 which creates a network message that includes a header field and a payload field. To avoid the use of a second network message/ping that is sent through the proxy server to extract the session identifiers, as shown in FIG. 1, the sample environment 200 of FIG. 2 allows for a single beacon 212 to be sent via ping 208 to the proxy server 230 from the client device 202, without the need for an extra network message (e.g., second ping 116 of FIG. 1). For example, the meter 210 sends the beacon 212 using the HTTP CONNECT request which establishes a tunnel to the proxy server 214. For example, the proxy 230 can be asked to tunnel the connection to the desired HTTPS site (e.g., AME server 250), with the proxy server establishing the connection and continuing to proxy the data stream to and from the client device 202. For example, to expedite the extraction of the identifiers at the proxy server 230, the beacon 212 can contain the session identifier in the HTTPS header field of beacon 212. The use of HTTP CONNECT allows the proxy server 230 to extract the identifiers from the HTTPS header of beacon 212. The extracted census identifier can then be matched, at the proxy server 230, with panel identifiers available from the AME server 250 without the need for an additional ping with data in the domain of the header field. This approach reduces the cost associated with maintaining an additional data processing facility and sequencing extra data.

The AME server 250 of the illustrated example in FIG. 2 records that a request (e.g., the beacon 212) was received and also records any data contained in the beacon 212 (e.g., the location identifier, the media identifier, the timestamp, a cookie, etc.). The AME server 250, in some examples, responds to the request with an acknowledgement message. In some examples, the acknowledgement message requests and/or sets a cookie in the device 202 to enable identification of subsequent beacons from the same client device. In some examples, the session identifier can be inserted into the HTTPS header every time the session reloads. In some examples, the identifier can be inserted into another non-encrypted field of the header or payload.

Figure 3:
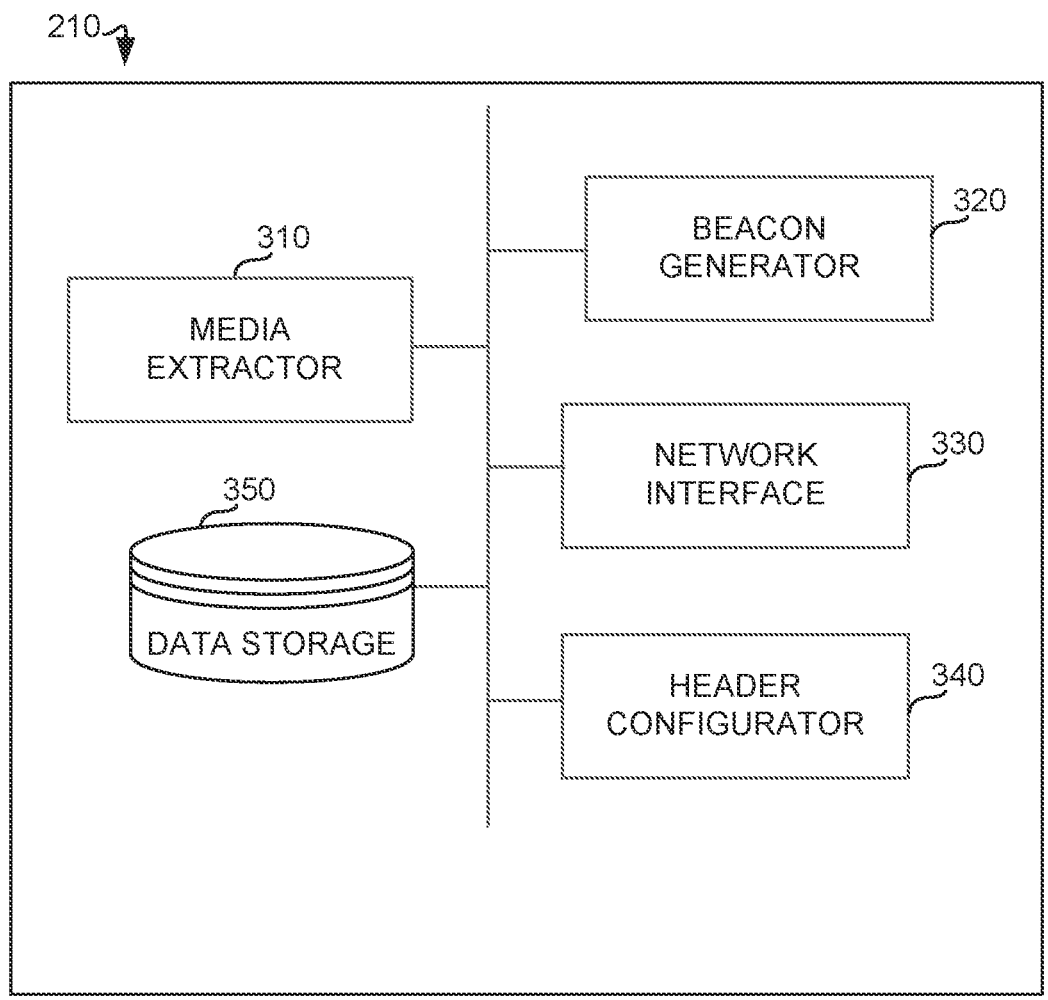
FIG. 3 is a block diagram of an example implementation of the panel meter in FIG. 2 that may facilitate census and panel matching using Hypertext Transfer Protocol headers.

FIG. 3 is a block diagram of an example implementation of the meter 210 in FIG. 2 that may facilitate census and panel matching using Hypertext Transfer Protocol headers. The example meter 210 of the illustrated example includes an example media extractor 310, an example beacon generator 320, an example network interface 330, an example header configurator 340, and an example data storage 350. The meter 210 includes an example media extractor 310 to generate a web request 204 to obtain media 206 from the media hosting server 240. The meter 210 includes an example beacon generator 320 to generate a beacon 212 to transmit session identifier(s) to the proxy server 230. In some examples, the beacon generator 320 may include session identifier(s) in the header field. The meter 210 includes an example network interface 330 to allow for communication among the meter 210, proxy server 230, media hosting server 240, and AME server 250 using network 220. In some examples, the network interface 330 may be used to generate an HTTP request to connect to the proxy server 230. In some examples, the HTTP request can be an HTTP CONNECT request that permits the establishment of a tunnel between client device 202 of FIG. 2 and the AME server 250 or the media hosting server 240 via the proxy server 230. The meter 210 includes an example header configurator 340 to configure the beacon 212 to include identifiers session identifiers in the HTTPS header. The meter 210 includes an example data storage 350 to store media data 206 and session identifier information used for insertion into the HTTPS header of beacon 212. The example data storage 350 of FIG. 3 may be implemented by any storage device and/or storage disc for storing data such as, for example, flash memory, magnetic media, optical media, etc. Furthermore, the data stored in the data storage 350 may be in any data format such as, for example, binary data, comma delimited data, tab delimited data, structured query language (SQL) structures, etc. While in the illustrated example the data store 350 is illustrated as a single database, the data storage 350 can be implemented by any number and/or type(s) of databases.

Figure 4:
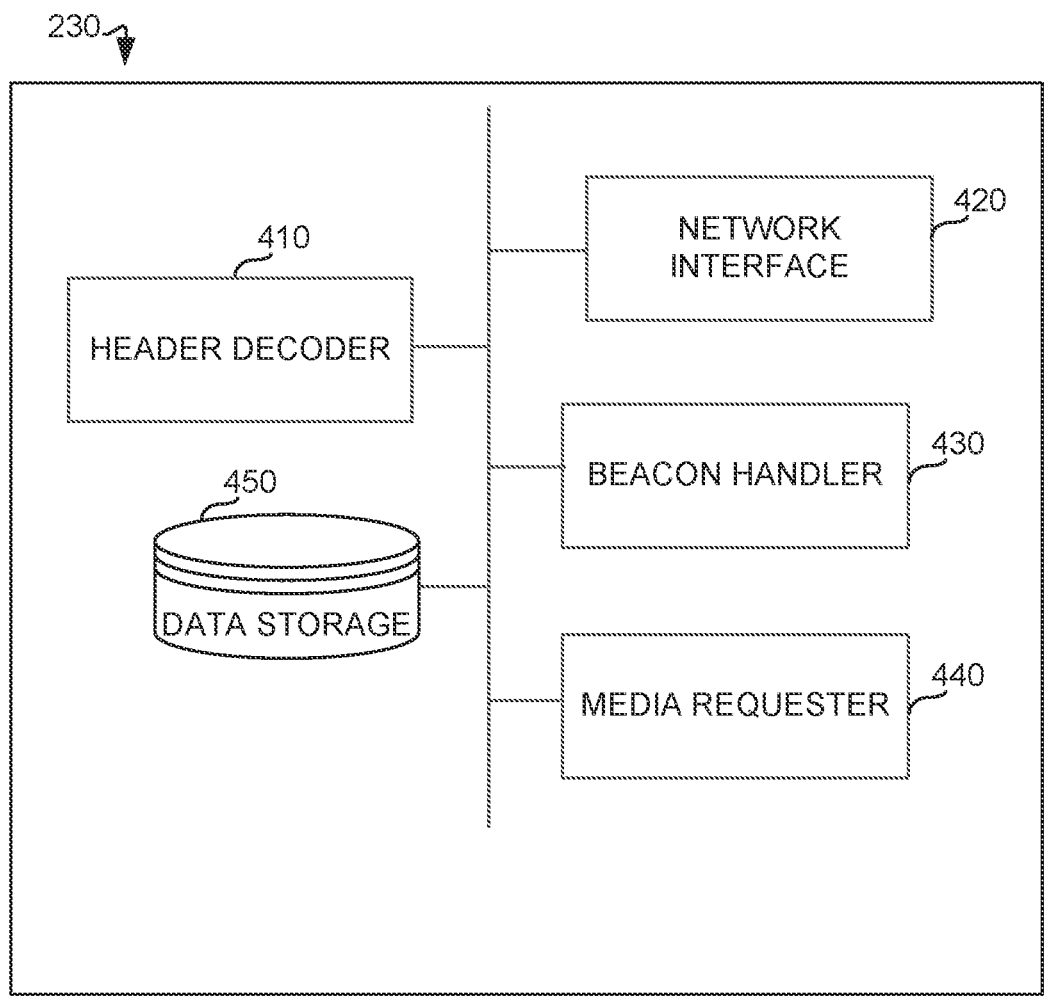
FIG. 4 is a block diagram of an example implementation of the proxy server in FIG. 2 that may facilitate census and panel matching using Hypertext Transfer Protocol headers.

FIG. 4 is a block diagram of an example implementation of the proxy server 230 in FIG. 2 that may facilitate census and panel matching using Hypertext Transfer Protocol headers. The example proxy 230 of the illustrated example includes an example header decoder 410, an example network interface 420, an example beacon handler 430, an example media requester 440, and an example data storage 450. The proxy server 230 includes an example header decoder 410 to parse the beacon 212 for the HTTPS header to extract the session identifier(s) associated with client device 202. The proxy server 230 includes an example network interface 420, to allow for communication among the meter 210, media hosting server 240, and AME server 250. The proxy server 230 includes an example beacon handler 430 to parse the beacon 212 to identify information related to the client device 202.

In FIG. 4, the proxy server 230 includes data storage 450 to store information extracted from the HTTPS header of the beacon 212. In some examples, the data storage 450 may include information on panel identifiers from the AME server 250 of FIG. 2 to allow the proxy server 230 to match session identifiers obtained from beacon 212 to panel identifiers. In some examples, the proxy server 230 may not be able to match the session identifier to a panel identifier, indicating the data collected is census data (i.e., is not panelist data) and the session identifier is a census identifier. For example, the panel identifier identifies the panelists that requested the media. The panel identifier identifies the panelist, and can include, for example, a mobile device identifier (e.g., a MAC address), a panelist name, a telephone number, a cookie, etc. Additionally, any additional or alternative information may be used to identify the media that was requested such as, for example, the vendor identifier, the tag encoded in the media 206 of FIG. 2, etc.

The example data storage 450 of FIG. 4 may be implemented by any storage device and/or storage disc for storing data such as, for example, flash memory, magnetic media, optical media, etc. Furthermore, the data stored in the data storage 450 may be in any data format such as, for example, binary data, comma delimited data, tab delimited data, structured query language (SQL) structures, etc. While in the illustrated example the data store 450 is illustrated as a single database, the data storage 450 can be implemented by any number and/or type(s) of databases.

While an example manner of implementing the panel meter 210 and the proxy server 230 of FIG. 2 is illustrated in FIGS. 3-4, one or more of the elements, processes and/or devices illustrated in FIG. 3-4 may be combined, divided, re-arranged, omitted, eliminated and/or implemented in any other way. Further, the example media extractor 310, the example beacon generator 320, the example network interface 330, the example header configurator 340, the example data storage 350 and/or, more generally, the example panel meter 210 of FIG. 2 may be implemented by hardware, software, firmware and/or any combination of hardware, software and/or firmware. Likewise, the example header decoder 410, the example network interface 420, the example beacon handler 430, the example media requester 440, the example data storage 450 and/or more generally the example proxy server 230 of FIG. 2 may be implemented hardware, software, firmware and/or any combination of hardware, software and/or firmware. Thus, for example, any of the example media extractor 310, the example beacon generator 320, the example network interface 330, the example header configurator 340, the example data storage 350, the example header decoder 410, the example network interface 420, the example beacon handler 430, the example media requester 440, and the example data storage 450 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of any of the example media extractor 310, the example beacon generator 320, the example network interface 330, the example header configurator 340, the example data storage 350, the example header decoder 410, the example network interface 420, the example beacon handler 430, the example media requester 440, and the example data storage 450 is/are hereby expressly defined to include a non-transitory computer readable storage device or storage disk such as a memory, a digital versatile disk (DVD), a compact disk (CD), a Blu-ray disk, etc. including the software and/or firmware. Further still, the example panel meter 210 and the proxy server 230 of FIG. 2 may include one or more elements, processes and/or devices in addition to, or instead of, those illustrated in FIGS. 3-4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example machine readable instructions, hardware implemented state machines, and/or any combination thereof for implementing the meter 210 of FIGS. 2-3 and proxy server 230 of FIGS. 2 and 4 are shown in FIGS. 5-6 and FIGS. 7-8, respectively. In this example, the machine readable instructions may be one or more executable programs or portion(s) on an executable program for execution by a computer processor such as the processors 1106 and 1206, shown in the example processor platforms 1100 and 1200 discussed below in connection with FIGS. 5-8. The program may be embodied in software stored on a non-transitory computer readable storage medium such as a CD-ROM, a floppy disk, a hard drive, a digital versatile disk (DVD), a Blu-ray disk, or a memory associated with the processors 1106 and 1206, but the entire program and/or parts thereof could alternatively be executed by a device other than the processors 1106 and 1206 and/or embodied in firmware or dedicated hardware. Further, although the example program is described with reference to the flowcharts illustrated in FIGS. 5-8, many other methods of implementing the example meter 210 and example proxy server 230 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 5, 6, 7 and/or 8 may be implemented using executable instructions (e.g., computer and/or machine readable instructions) stored on a non-transitory computer and/or machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 5:
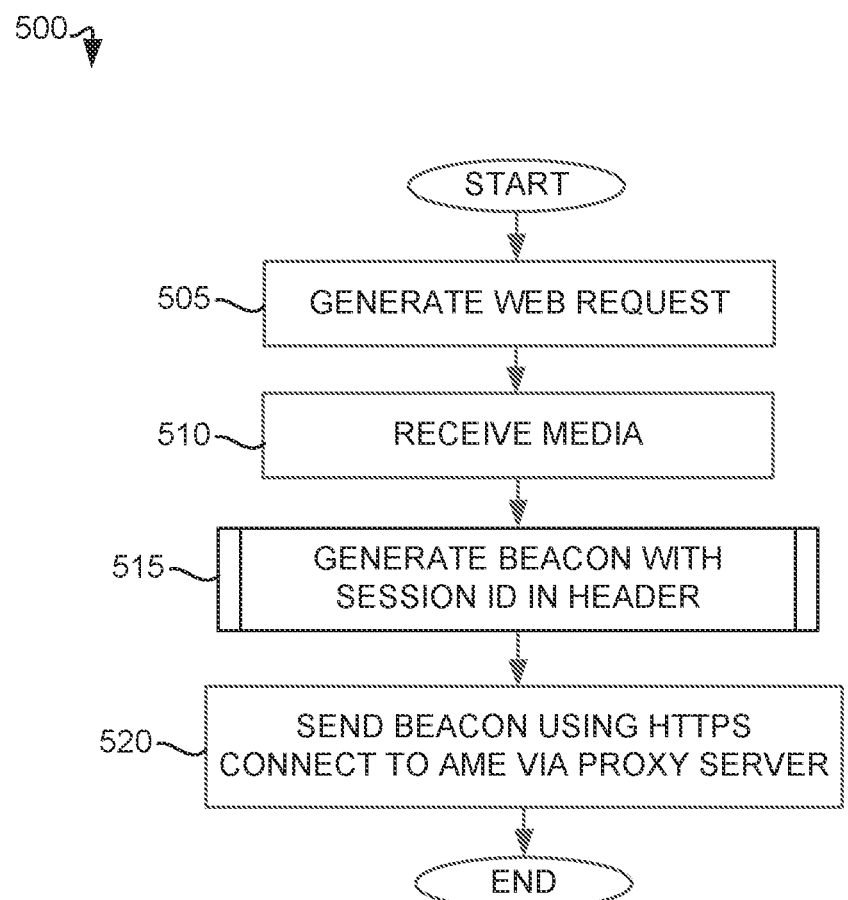
FIG. 5 is a flowchart representative of example machine-readable instructions that may be executed to cause a client device to generate and transmit a beacon to a proxy server.

The example process 500 of FIG. 5 initiates the meter 210 of the client device 202 to generate and send a beacon to the proxy server 230 of FIGS. 2 and 4. The example program of FIG. 5 begins at block 505 when the meter 210 generates a web request 204 that results in the media 206 being sent to the client device 202 from the media hosting server 240. The device 202 receives the media at block 510, prompting the meter 210 to generate a beacon 212 with the session identifier information included in the header of the network message, as indicated at block 515. In some examples, the generated beacon can include a user agent string, a media identifier, a host identifier, a timestamp, and one or more command identifiers. At block 520, the meter 210 transmits the beacon 212 to the proxy server 230 using an HTTP method. In some examples, the HTTP method can include an HTTP CONNECT method which is used to access websites that use Security Sockets Layer (SSL) (e.g., HTTPS).

Figure 6:
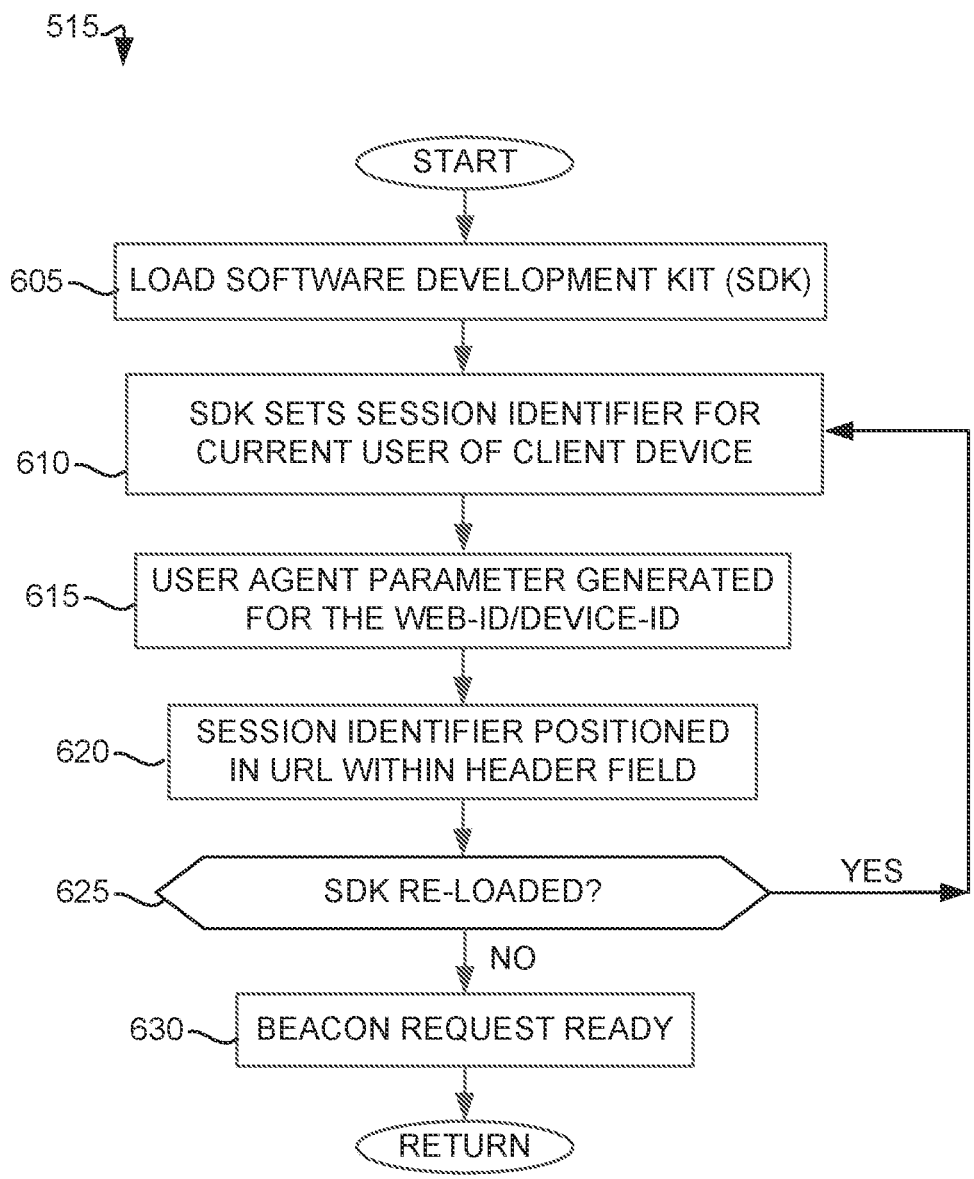
FIG. 6 is a flowchart representative of example machine-readable instructions that may be executed to generate a beacon with identifiers in the header.

FIG. 6 shows an example process 600 that can be implemented by the meter 210 of the client device 202 in FIG. 2 to generate the beacon 212 with the session identifier in the header field of the network message. At block 605, a software development kit (SDK) is loaded. At block 610, the SDK sets the session identifier for the current user of the client device 202. For example, a session can represent the period of time a user has a specific website open, such as the media 206 shown to the user as a result of the web request 204 in FIG. 2. When the SDK is initialized, the website is opened, with the last event triggered by a user marking the end time of a session. All events with the same session share the same session identifier (e.g., session ID). In some examples, the session ID must be set by the SDK in order for the session to be tracked for purposes of monitoring media usage, which is later reported to the monitoring entity (e.g., audience measurement entity). At block 615, other information to be incorporated into the beacon is set, such as the user agent parameter generated to include web-ID/device-ID information. User agents are unique to every website visitor or user, identifying the technical data about the client device 202. Based on the browser information identified through the user agent (i.e., operating system, device pixel ratio, screen resolution, browser window size, etc.), websites can respond more dynamically to enhance a user's experience of the site (i.e., delivering custom JavaScript, checking browser capabilities, changing page layout, etc.). At block 620, the session identifier is positioned in the HTTPS header field of beacon 212. In some examples, insertion of the session identifier into the HTTPS header may be optional when the session identifier has not changed or the proxy 230 is able to associate the user of the client device 202 with the session without needing to check the HTTPS header. In some examples, if the proxy server 230 has already matched a session identifier with a panel identifier, the HTTPS header may not include the session identifier if the additional session identifier information is not needed for purposes of matching session identifiers to panel identifiers. At block 625, if the SDK has re-loaded, indicating the start of a new session, the process reverts back to block 610, where the SDK sets a new session identifier. At block 630, if the SDK has not re-loaded, the beacon request 212 is ready for deployment.

Figure 7:
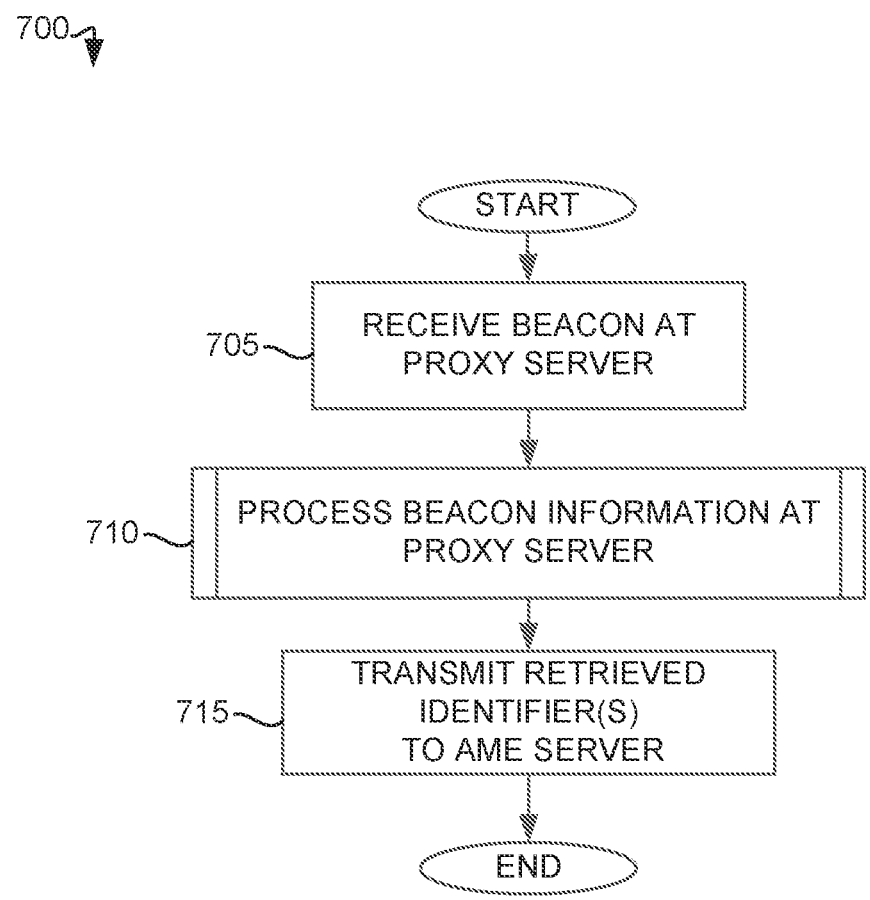
FIG. 7 is a flowchart representative of example machine-readable instructions that may be executed to cause a proxy server to receive and process a beacon from a client device.

FIG. 7 is a flowchart of an example process 700 by the proxy server 230 to retrieve information from a beacon. The proxy server 230 receives beacon 212 at block 705 and parses the beacon at block 710. For example, the proxy 230 can retrieve HTTPS header information from the beacon, which includes the session identifier. Based on panel identifiers known to the AME server 250, the proxy can proceed to match the session identifier with panel identifiers that are related to the client device 202 based on meter 210 data. In some examples, if the proxy does not identify the session identifier with a panel identifier, then the session data is census data retrieved from a non-panelist. In some examples, the retrieved identifiers may be transmitted to the AME server 250 at block 715. In some examples, the retrieved identifiers may be stored in the proxy server 230 in the data storage 450 of FIG. 4.

Figure 8:
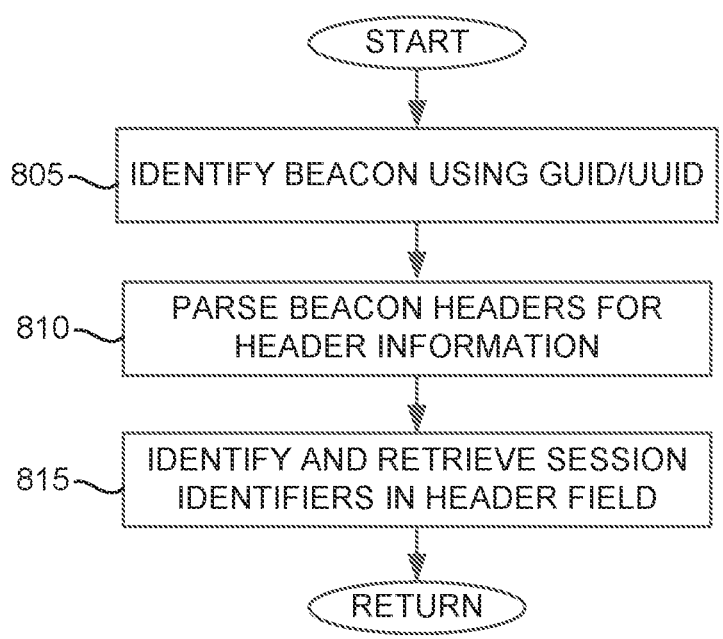
FIG. 8 is a flowchart representative of example machine-readable instructions that may be executed to process beacon information at a proxy server.

FIG. 8 is a flowchart of an example process 800 by the proxy server 230 of FIGS. 2 and 4 to process the information of beacon 212 of FIG. 2. At block 805, the received beacon 212 is identified using a globally unique identifier (GUID). In some examples, the beacon 212 can also be identified using a universally unique identifier (UUID). For example, prior to deployment, the beacon 212 may be assigned a GUID or UUID to distinguish it from other beacons on the network. In some examples, the beacon 212 may also be assigned major and/or minor values to identify and distinguish the beacon 212 as part of a group or as an individual of the group. At block 810, the proxy server 230 begins to parse the beacon 212 headers for HTTPS header information. For example, the HTTPS header can have a session identifier appended to, for example, the URL, which the proxy server retrieves at block 815. In some examples, the beacon 212 may not include the session identifier information in the header field.

Figure 9:
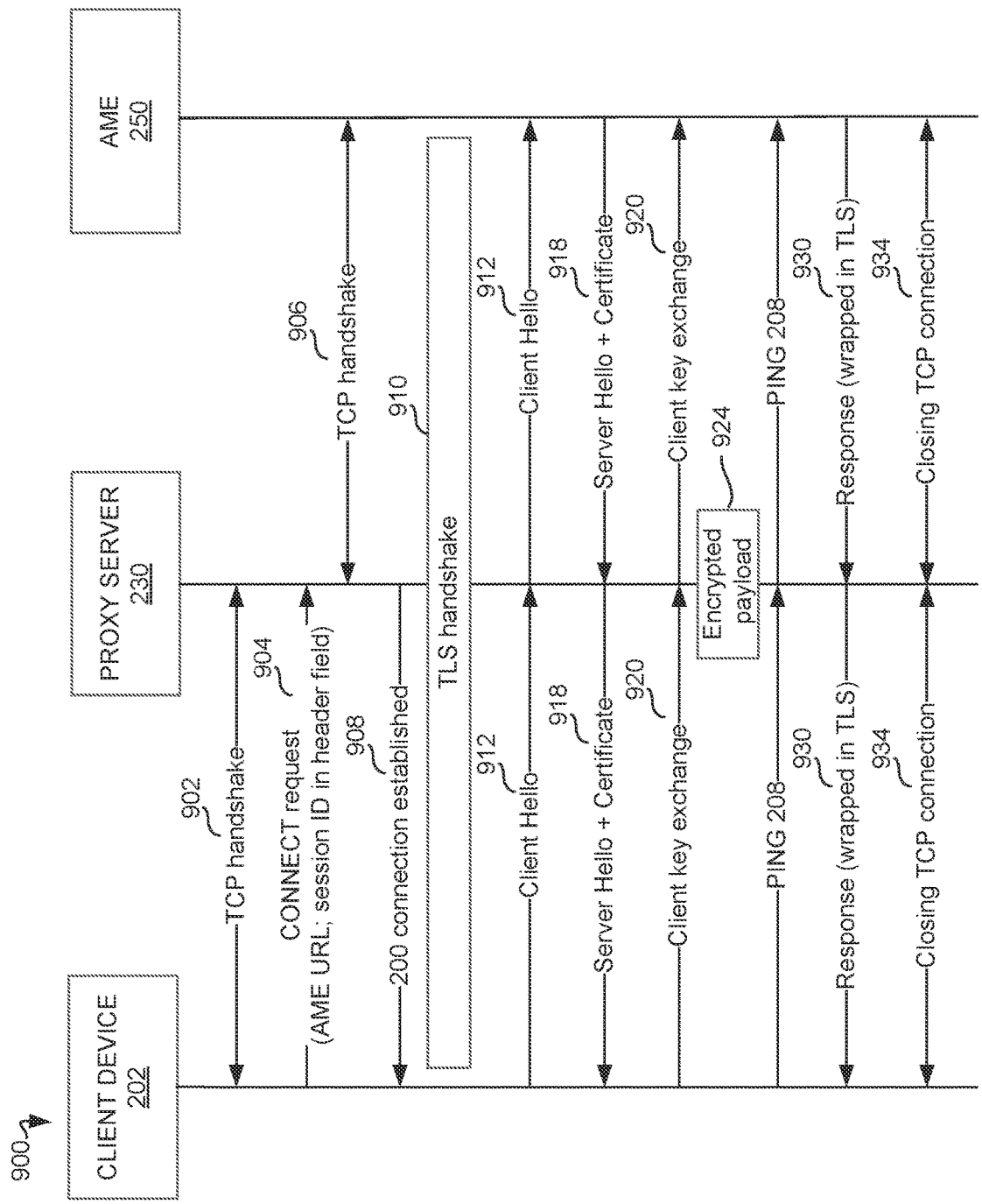
FIG. 9 is a data flow diagram illustrating the network communication among the system devices of FIG. 2 using Hypertext Transfer Protocol tunneling.

FIG. 9 is a data flow diagram illustrating an example communication among the client device 202, proxy server 230, and audience measurement entity 250 systems using the HTTP CONNECT method 900. The browser of client device 202 of FIG. 2 can create a connection via a transmission control protocol (TCP) handshake 902 with the proxy server 230 to allow for the exchange of data. The client device 202 then proceeds to send a CONNECT request 904 with the name of the domain to the proxy which the client device 202 is attempting to establish a communication with, such as the AME server 250. In some examples, the CONNECT request 904 to the proxy 230 can include the AME URL, with the session identifier in the header field of the beacon 212. Once the proxy 230 successfully establishes a connection with the AME server 250 using the TCP handshake 906, the proxy 230 can respond with a "2xx response" such as the 200 connection response 908. A transport layer security (TLS) handshake 910 is established that permits the formation of a tunnel allowing information that is encrypted to pass through the proxy server to the AME server 250. The proxy server 230 therefore can pass requests from the client device 202 to the AME server 250 until the connection is closed. For example, once the connection between the client device 202 and AME server 250 is established, the client device sends a Client Hello 912 that passes to the proxy server 230, which passes the Client Hello 912 to the AME server 250. The AME server 250 must respond with a Sever Hello message 918 to establish security enhancement capabilities between the client device 202 and the AME server 250. In some examples, the client device 202 may also request a certification, which can be included with the Sever Hello 918. For example, the Client Hello 912 may include information such as the SSL protocol version the client 202 wishes to use. A client key exchange 920 is then sent by the user agent to the AME server 250 for purposes of encryption. At this point, the proxy server 230 can now forward the network messages from the client device 202 to the AME server 250 but is not able to access the encrypted payloads 924. For example, a beacon 212 sent to the proxy server via ping 208 is sent as a secure message via HTTP CONNECT, such that the payload of the beacon is not accessible to the proxy server for the retrieval of any session identifiers. However, the header field of the beacon 212 is not encrypted, allowing the proxy server 230 to retrieve any session identifiers from the HTTPS header. The ping 208 information forwarded to the AME server 250 may include information such as what media 206 was accessed by the client device 202 using the web request 204. Any response from the AME server 250 to the client device 202 may be wrapped in TLS 930 to ensure that the information remains encrypted during communication between the two entities. The connection between the client device 202 and the AME server 250 can be closed at 934. For example, the TCP connection with the AME server 250 can be closed using a FIN request originating from the client device 202.

Figure 10:
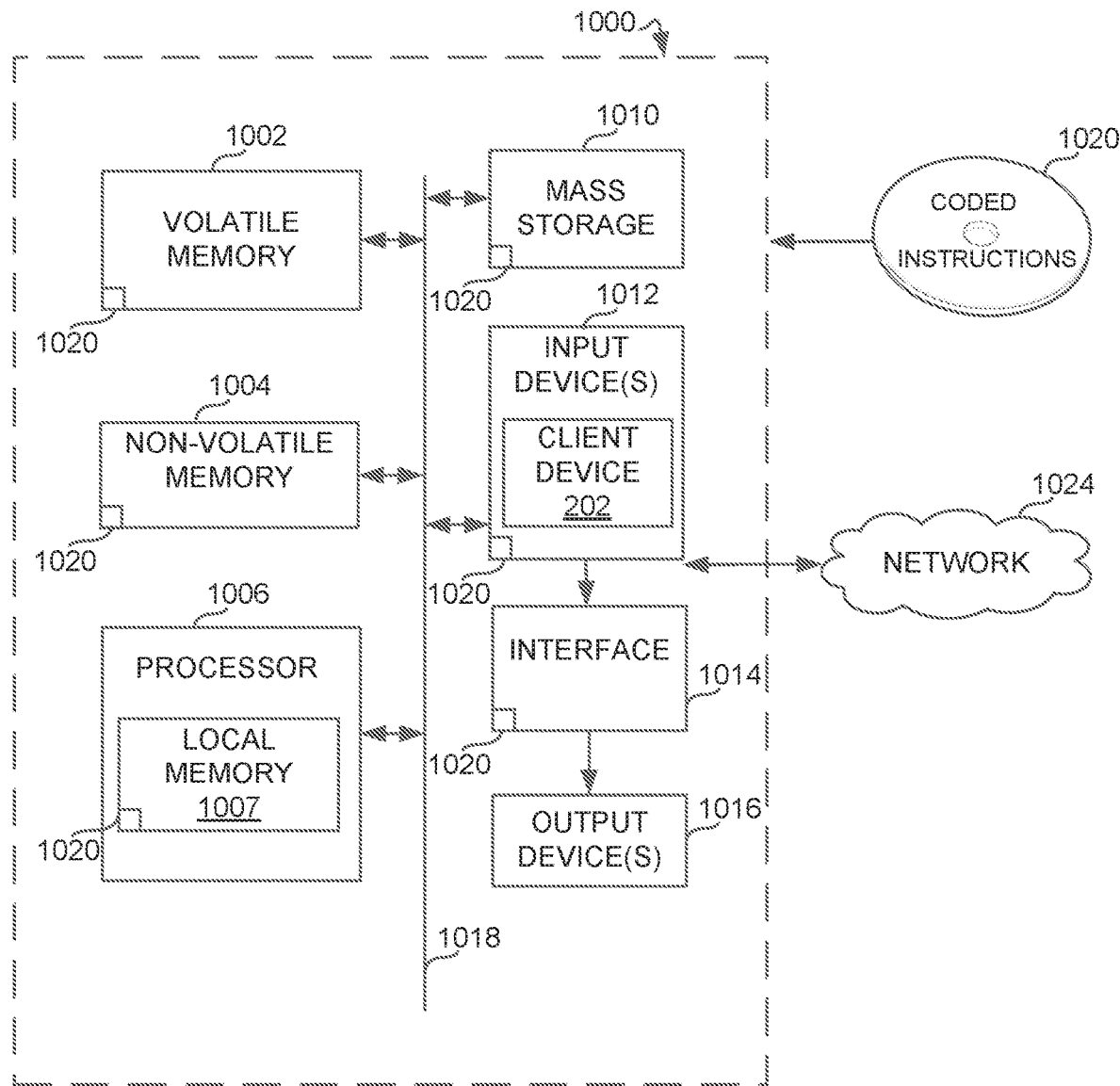
FIG. 10 is a block diagram of an example processing platform structured to execute the instructions of FIG. 5-6 to implement the example panel meter of FIG. 3.

FIG. 10 is a block diagram of an example processor platform 1000 structured to execute the instructions of FIGS. 5 and 6 to implement the example panel meter 210 of FIGS. 2-3. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1006. The processor 1006 of the illustrated example is hardware. For example, the processor 1006 can be implemented by one or more integrated circuits, logic circuits, microprocessors, GPUs, DSPs, or controllers from desired family or manufacturer. The hardware processor may be a semiconductor based (e.g., silicon based) device.

The processor 1006 of the illustrated example includes a local memory 1007 (e.g., a cache). The processor 1006 of the illustrated example is in communication with a main memory including a volatile memory 1002 and a non-volatile memory 1004 via a bus 1018. The volatile memory 1002 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1004 may be implemented by flash memory and/or any other desired type of memory device. Access to the main memory 1002 and 1004 is controlled by a memory controller.

The processor platform 1000 of the illustrated example also includes an interface circuit 1014. The interface circuit 1014 may be implemented by any type of interface standard, such as an Ethernet interface, a universal serial bus (USB), a Bluetooth® interface, a near field communication (NFC) interface, and/or a PCI express interface.

In the illustrated example, one or more input devices 1012 are connected to the interface circuit 1014. The input device(s) 1012 permit(s) a user to enter data and/or commands into the processor 1006. The input device(s) can be implemented by, for example, an audio sensor, a microphone, a camera (still or video), a keyboard, a button, a mouse, a touchscreen, a track-pad, a trackball, isopoint and/or a voice recognition system. In FIG. 10, the input device includes the client device 202 of FIG. 2.

One or more output devices 1016 are also connected to the interface circuit 1014 of the illustrated example. The output devices 1016 can be implemented, for example, by display devices (e.g., a light emitting diode (LED), an organic light emitting diode (OLED), a liquid crystal display, a cathode ray tube display (CRT), an in-place switching (IPS) display, a touchscreen, a tactile output device, a printer and/or speakers). The interface circuit 1014 of the illustrated example, thus, typically includes a graphics driver card, a graphics driver chip and/or a graphics driver processor.

The interface circuit 1014 of the illustrated example also includes a communication device such as a transmitter, a receiver, a transceiver, a modem, a residential gateway, a wireless access point, and/or a network interface card to facilitate exchange of data with external machines (e.g., computing devices of any kind) via a network 1024 (e.g., an Ethernet connection, a digital subscriber line (DSL), a telephone line connection, a coaxial cable system, a satellite system, a line-of-site wireless system, a cellular telephone system, etc.).

The processor platform 1000 of the illustrated example also includes one or more mass storage devices 1010 for storing software and/or data. Examples of such mass storage devices 1010 include floppy disk drives, hard drive disks, compact disk drives, Blu-ray disk drives, RAID systems, and digital versatile disk (DVD) drives.

The machine executable instructions 1022 of FIGS. 5 and 6 may be stored in the mass storage device 1010, in the volatile memory 1002, in the non-volatile memory 1004, and/or on a removable non-transitory computer readable storage medium such as a CD or DVD.

Figure 11:
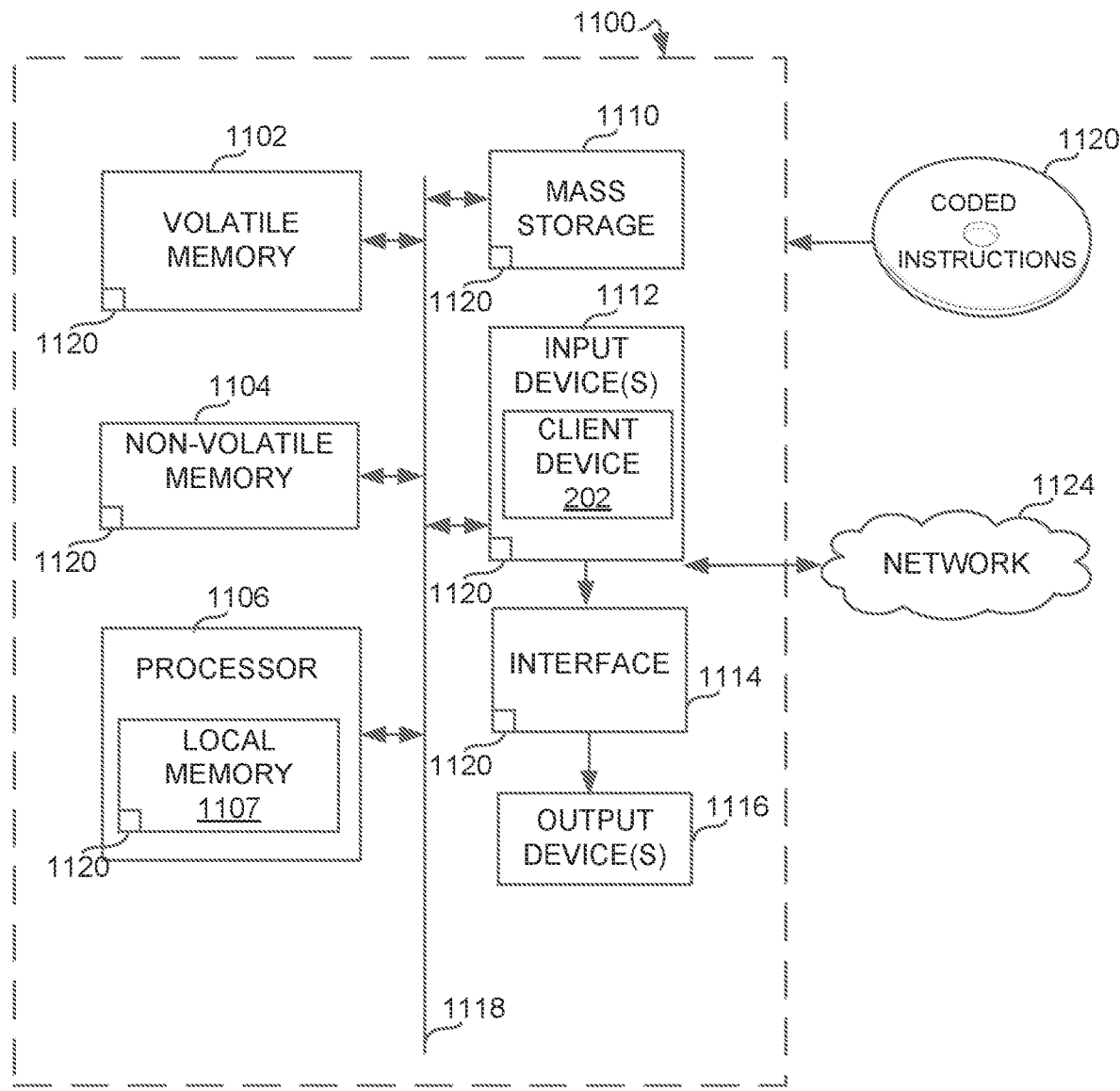
FIG. 11 is a block diagram of an example processing platform structured to execute the instructions of FIG. 7-8 to implement the example proxy server of FIG. 4.

FIG. 11 is a block diagram of an example processor platform 1100 structured to execute the instructions of FIGS. 7 and 8 to implement the example proxy server 230 of FIGS. 2 and 4. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1106. The processor 1106 of the illustrated example is hardware. For example, the processor 1106 can be implemented by one or more integrated circuits, logic circuits, microprocessors, GPUs, DSPs, or controllers from any desired family or manufacturer. The hardware processor may be a semiconductor based (e.g., silicon based) device.

The processor 1106 of the illustrated example includes a local memory 1107 (e.g., a cache). The processor 1106 of the illustrated example is in communication with a main memory including a volatile memory 1102 and a non-volatile memory 1104 via a bus 1118. The volatile memory 1102 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1104 may be implemented by flash memory and/or any other desired type of memory device. Access to the main memory 1102 and 1104 is controlled by a memory controller.

The processor platform 1100 of the illustrated example also includes an interface circuit 1114. The interface circuit 1114 may be implemented by any type of interface standard, such as an Ethernet interface, a universal serial bus (USB), a Bluetooth® interface, a near field communication (NFC) interface, and/or a PCI express interface.

In the illustrated example, one or more input devices 1112 are connected to the interface circuit 1114. The input device(s) 1112 permit(s) a user to enter data and/or commands into the processor 1106. The input device(s) can be implemented by, for example, an audio sensor, a microphone, a camera (still or video), a keyboard, a button, a mouse, a touchscreen, a track-pad, a trackball, isopoint and/or a voice recognition system. In FIG. 11, the input device includes the client device 202 of FIG. 2.

One or more output devices 1116 are also connected to the interface circuit 1114 of the illustrated example. The output devices 1116 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1114 of the illustrated example, thus, typically includes a graphics driver card, a graphics driver chip and/or a graphics driver processor.

The interface circuit 1114 of the illustrated example also includes a communication device such as a transmitter, a receiver, a transceiver, a modem, a residential gateway, a wireless access point, and/or network interface card to facilitate exchange of data with external machines (e.g., computing devices of any kind) via a network 1124 (e.g., an Ethernet connection, a digital subscriber line (DSL), a telephone line connection, a coaxial cable system, a satellite system, a line-of-site wireless system, a cellular telephone system, etc.).

The processor platform 1100 of the illustrated example also includes one or more mass storage devices 1110 for storing software and/or data. Examples of such mass storage devices 1110 include floppy disk drives, hard drive disks, compact disk drives, Blu-ray disk drives, RAID systems, and digital versatile disk (DVD) drives.

The machine executable instructions 1120 of FIGS. 7 and 8 may be stored in the mass storage device 1110, in the volatile memory 1102, in the non-volatile memory 1104, and/or on a removable non-transitory computer readable storage medium such as a CD or DVD.

From the foregoing, it will be appreciated that example methods, apparatus and systems have been disclosed which permit a session identifier to be included in a generic non-encrypted HTTPS header property of a secure network message, for purposes of allowing a proxy server to retrieve the information from a single network message and match the session identifier to a panel identifier. Certain examples disclosed herein improve the retrieval of session identifiers at the proxy server while reducing the time and cost associated with processing and storing additional information when processing two network messages (e.g., pings) instead of one to retrieve the identifier. Certain examples disclosed herein allow a client device to establish a connection with a monitoring entity (e.g., audience measurement entity) through a proxy server using an HTTP method that permits sending secure network messages using HTTPS, such as an HTTP CONNECT method. Certain examples disclosed herein permit a session identifier to not be included in the header field for purposes of increased privacy and security when a session identifier has not changed or a session can already be linked with a panel identifier or a census identifier without the need to retrieve the session identifier from the beacon header fields.

Although certain example methods, apparatus and system have been disclosed herein, the scope of coverage of this patent is not limited thereto. On the contrary, this patent covers all methods, apparatus and articles of manufacture fairly falling within the scope of the claims of this patent.

What is claimed is:

1. A media device comprising:
    a processor; and
    memory having stored thereon instructions that, when executed by the processor, cause the media device to be configured to:
        access a first session identifier set by an on-device meter loaded on the media device, wherein the first session identifier is associated with a current user of the media device;
        position the first session identifier within a header field of a first HTTPS network message;
        transmit the first network message to a proxy server, wherein the proxy server is configured to parse the first session identifier from the HTTPS header field;

after transmitting the first HTTPS network message to the proxy server, determine that the on-device meter has re-loaded;

in response to determining that the on-device meter has re-loaded, access a second session identifier set by the on-device meter subsequent to setting the first session identifier, wherein the second session identifier is different from the first session identifier;

position the second session identifier within a header field of a second HTTPS network message; and transmit the second HTTPS network message to the proxy server, wherein the first session identifier or the second session identifier is transmitted to a monitoring entity, the monitoring entity configured to associate the first session identifier or the second session identifier with at least a panel identifier.

2. The media device of claim 1, wherein the first session identifier is a census identifier for a session generated as a result of a request for media.

3. The media device of claim 1, wherein the instructions further cause, when executed by the processor, the media device to be configured to initiate the on-device meter, wherein initiating the on-device meter causes the on-device meter to set the first session identifier.

4. The media device of claim 1, wherein the network message is encrypted, and the HTTPS header field is not encrypted.

5. The media device of claim 2, wherein the HTTPS header field is part of an HTTPS CONNECT request network message header associated with a beacon generated during the request for media.

6. The media device of claim 1, wherein the HTTPS network message is a hypertext transfer protocol message.

7. The media device of claim 1, wherein the instructions further cause, when executed by the processor, the media device to be configured to transmit the first HTTPS network message to the proxy server using hypertext transfer protocol tunneling.

8. A method comprising:

accessing a first session identifier set by an on-device meter loaded on a media device, wherein the first session identifier is associated with a current user of the media device;

positioning the first session identifier within a header field of a first HTTPS network message;

transmitting the first network message to a proxy server for parsing of the HTTPS header field to retrieve the first session identifier;

after transmitting the first HTTPS network message to the proxy server, determining that the on-device meter has re-loaded;

in response to determining that the on-device meter has re-loaded, accessing a second session identifier set by the on-device meter subsequent to setting the first session identifier, wherein the second session identifier is different from the first session identifier;

positioning the second session identifier within a header field of a second HTTPS network message;

transmitting the second HTTPS network message to the proxy server; and parsing the HTTPS header field of the second HTTPS network message to retrieve the second session identifier, wherein at least one of the first session identifier or the second session identifier is a census identifier for a session generated as a result of a request for media.

9. The method of claim 8, further including retrieving the first session identifier linked to a device that generated the request for media.

10. The method of claim 8, further including initiating the on-device meter, wherein initiating the on-device meter causes the on-device meter to set the first session identifier.

11. The method of claim 8, further including transmitting the first session identifier or the second session identifier to a monitoring entity, the monitoring entity associating the first session identifier or the second session identifier with at least a panel identifier.

12. The method of claim 8, wherein the first HTTPS network message is encrypted, and the HTTPS header field is not encrypted.

13. The method of claim 8, wherein the HTTPS header field is part of a network message header associated with a beacon generated during the request for media.

14. The method of claim 8, further including transmitting the first HTTPS network message to the proxy server using hypertext transfer protocol tunneling.

15. A non-transitory computer readable medium having stored thereon instructions that, when executed by a processor of a computing system, cause performance of operations comprising:

accessing a first session identifier set by an on-device meter loaded on a media device, wherein the media device is generating a request for media;

positioning the first session identifier within a header field of a first HTTPS network message;

transmitting the first HTTPS network message to a proxy server for parsing of the HTTPS header field to retrieve the first session identifier;

after transmitting the first HTTPS network message to the proxy server, determining that the on-device meter has re-loaded;

in response to determining that the on-device meter has re-loaded, accessing a second session identifier set by the on-device meter subsequent to setting the first session identifier, wherein the second session identifier is different from the first session identifier;

positioning the second session identifier within a header field of a second HTTPS network message; and transmitting the second HTTPS network message to the proxy server, wherein the first session identifier or the second session identifier is transmitted to a monitoring entity, the monitoring entity configured to associate the first session identifier or the second session identifier with at least a panel identifier.

16. The non-transitory computer readable medium of claim 15, wherein the operations further include transmitting the first session identifier or the second session identifier to a monitoring entity configured to associate the first session identifier or the second session identifier with at least a panel identifier.

17. The non-transitory computer readable medium of claim 15, wherein the first HTTPS network message is encrypted, and the HTTPS header field is not encrypted.

18. The non-transitory computer readable medium of claim 15, wherein the HTTPS header field is part of a network message header associated with a beacon generated during the request for media.

19. The non-transitory computer readable medium of claim 15, wherein the first HTTPS network message is a hypertext transfer protocol message.

* * * * *